United States Patent Office
2,823,231
Patented Feb. 11, 1958

2,823,231

PROCESS FOR THE PRODUCTION OF NAPHTHA-
LENE-2,6-DICARBOXYLIC ACID AND ITS DE-
RIVATIVES

Bernhard Raecke and Hubert Schirp, Dusseldorf, Germany, assignors to Henkel & Cie. G. m. b. H., Dusseldorf-Holthausen, Germany No Drawing. Application January 10, 1956
Serial No. 558,221

Claims priority, application Germany January 15, 1955

12 Claims. (Cl. 260—515)

This invention relates to a process for the production of naphthalene-2,6-dicarboxylic acid and its esters, halides and amides, and more particularly to a method of producing such dicarboxylic compounds from α- or β-naphthoic acid.

We have discovered that excellent, commercially attractive yields of naphthalene-2,6-dicarboxylic acid or its esters, halides and amides are obtained by heating the potassium salt of α- or β-naphthoic acid to elevated temperatures to form the dipotassium salt of naphthalene-2,6-dicarboxylic acid, and thereafter converting the dipotassium salt into either the free acid or its derivatives, such as esters, amides, halides and the like.

While the conversion from the potassium salt of α- or β-naphthoic acid into the dipotassium salt of naphthalene-2,6-dicarboxylic acid in accordance with out invention will take place at temperatures somewhat lower than 360° C., for example at 330° C., it is necessary to heat the potassium salt of the naphthalene-monocarboxylic acid used as the starting material to a temperature above 360° C. in order to achieve a sufficiently rapid conversion for industrial purposes. The upper limit of temperature at which this conversion may be carried out is determined merely by the temperature at which the organic compounds present during the conversion decompose. In general, the conversion can be most advantageously effected within a temperature range from 390° C. to 450° C.

We have further found that the above procedure produces exceptionally good yields of the dipotassium salt of naphthalene-2,6-dicarboxylic acid when the potassium salt of a naphthalene-monocarboxylic acid is heated to the above-indicated temperatures in an atmosphere of an inert gas, such as nitrogen or carbon dioxide, or an inert gas containing carbon dioxide, especially at superatmospheric pressures. Thus, it is most advantageous to carry out the conversion in an autoclave.

In order to promote a uniform distribution of heat throughout the reaction mass, it is advantageous to carry out the conversion in a vessel provided with an agitating device or in a rotating vessel, for example, a rotary autoclave.

However, agitation of the reaction mass is not the only advantageous method of achieving uniform heat distribution. Thus, we have found that excellent results are also obtained by providing the vessel with an insert composed of horizontal shelves and vertical partitions spaced a few centimeters apart, distributing the potassium naphthoate on the shelves in thin layers and then heating the naphthoic acid salt to above 360° C. in an atmosphere of an inert gas, as previously described, but without agitation.

The starting material for the conversion of naphthalene-monocarboxylic acid salts in accordance with the present invention may be α-naphthoic acid, β-naphthoic acid or also their substitution products, such as 4-fluoro-α-naphthoic acid, 4-methyl-α-naphthoic acid, 3-chloro-α-naphthoic acid, 4-chloro-β-naphthoic acid, 4-ethyl-β-naphthoic acid, 8-methyl-β-naphthoic acid.

As the first step in the conversion process, the naphthoic acid or naphthoic acid substitution product is transformed into the corresponding potassium salt according to well-known methods, for example by neutralizing an aqueous solution of the naphthoic acid or its substitution product with potassium hydroxide. Subsequent thereto, the potassium salt is isolated by evaporating the aqueous solution in a spray-drier or a drum-drier, whereby the virtually anhydrous potassium salt is obtained. The use of substantially dry potassium naphthoates in the subsequent conversion to the potassium salt of naphthalene-2,6-dicarboxylic acid is especially advantageous, because the presence of even small quantities of moisture tends to reduce the yield of converted naphthalene dicarboxylic acid salt.

It is sometimes also advantageous to convert the potassium naphthoate into the potassium salt of naphthalene-2,6-dicarboxylic acid in the presence of inert materials, such as pieces of quartz or rock, porcelain spheres and the like, or in admixture with inert salts, such as potassium carbonate, potassium sulfate, potassium chloride and the like.

The potassium naphthoate used as the starting material in the conversion process according to the present invention need not be absolutely pure. For example, the potassium naphthoate may be of technical purity, i. e. it may have salts of other aromatic carboxylic acids, such as benzoic acid, phthalic acid and the like, admixed therewith.

While the process of our invention is workable with or without catalysts, we have found that the yield from the conversion of potassium α- or β-naphthoate into the potassium salt of naphthalene-2,6-dicarboxylic acid, as above described, is materially increased by the presence of catalysts, for example, metals such as lead, mercury, zinc, cadmium and their compounds. Cadmium and zinc and their compounds are especially effective catalysts.

Specific examples of cadmium compounds which may be advantageously used as catalysts are cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, and cadmium terephthalate. Similarly, the corresponding zinc compounds, i. e. zinc oxide, zinc iodide, zinc chloride, zinc sulfate, zinc phosphate, zinc carbonate, zinc acetate, zinc soaps, zinc benzoate, zinc phthalate, zinc isophthalate and zinc terephthalate, are examples of effective catalysts.

The presence of the above-recited catalysts tends to accelerate the conversion of the naphthalene-monocarboxylic acid salt into the naphthalene-dicarboxylic acid salt, so that the desired conversion reaction is favored over possible concurrent decomposition reactions. Consequently, the effects of the catalysts are manifested by an increase in the yield of the naphthalene-2,6-dicarboxylic acid salt, and also by a reduction in the period of time and the superatmospheric pressures required to bring about a commercially attractive degree of conversion.

The transformation of the potassium salt of naphthalene-2,6-dicarboxylic acid into the corresponding free acid or its esters, halides or amides, and their separation from the other components contained in the mixture formed by heating potassium α- or β-naphthoate as above described, can be readily accomplished, for example by utilizing the varying solubilities of the organic acid components in water or other conventional solvents. Thus, an especially effective separation procedure comprises dissolving the conversion product mixture obtained by the process in water, filtering off insoluble impurities from the resulting solution, acidifying the filtrate with a mineral or organic acid, such as sulfuric or hydrochloric acid, and separating the precipitated naphthalene-2,6-dicarboxylic acid from the acid solution.

The separation of naphthalene-2,6-dicarboxylic acid from the conversion product mixture is, however, not absolutely necessary in order to produce and recover its derivatives, such as its chlorides, amides and esters. Thus, the mono- and diethyl ester, the mono- and dimethyl ester, the mono- and bis-oxyethyl ester, the dichloride, the amides or other such derivatives can also be obtained with good yields and excellent purity directly from the conversion product mixture contained in the conversion vessel, or directly from the naphthalene-2,6-dicarboxylic acid precipitated from the aqueous solution of the conversion product mixture.

We have observed that substantial quantities of naphthalene are formed during the conversion of the potassium naphthoate into the potassium salt of naphthalene-2,6-dicarboxylic acid in accordance with the present invention. This fact tends to lend support to the theory that under the conversion conditions one molecule of the naphthalene mono-carboxylic acid salt gives up its —COOK group, which then migrates to a second molecule of potassium naphthoate and attaches itself in the 6-position, while a —COOK group in the 1-position on said second naphthoate molecule shifts to the 2-position. This theory also offers an explanation of the fact that if the starting material is potassium β-naphthoate the yield of naphthalene-2,6-dicarboxylic acid is greater than if the starting material is potassium α-naphthoate. It must be emphasized, however, that the theory above set forth is only one possible explanation of the changes which the starting material might undergo during the conversion according to the present invention, and should not be regarded as binding or with any degree of finality or definiteness.

Naphthalene-2,6-dicarboxylic acid is a well-known chemical compound, especially as a valuable intermediate in the production of high-molecular synthetic products. For example, in the form of its polyglycolesters it is useful in the production of films, threads and the like.

The following examples will further illustrate the present invention, but it is to be understood that we do not intend to limit our invention to the particular conditions and materials described in these examples.

*Example I*

30 gm. potassium α-naphthoate and 1 gm. cadmium fluoride were placed into a rotary autoclave having a net volume of 0.2 liter. Carbon dioxide was then introduced into the autoclave until the internal pressure reached 50 atmospheres gauge. Subsequently, the autoclave was heated to 450° C. for about 1 hour. At the maximum temperature the internal pressure was 140 atmospheres gauge. The autoclave was then opened and the raw product contained therein, a dark solid mass, was extracted in boiling water, whereby the potassium salts of aromatic carboxylic acids in the raw product were dissolved while the naphthalene and the catalyst remained undissolved. The hot aqueous solution was filtered and the hot filtrate was acidified with hydrochloric acid. The precipitate was filtered off and was washed with hot water and alcohol. The residue was virtually pure naphthalene-2,6-dicarboxylic acid. The yield was 9 gm., which is 58% of the theoretical yield. The term "theoretical yield" as used in this and the following examples, assumes the formation of 1 mol naphthalene-2,6-dicarboxylic acid and 1 mol naphthalene from 2 mols of α-naphthoic acid.

*Example II*

30 gm. potassium-β-naphthoate and 1 gm. cadmium fluoride were heated to 430° C. for 1 hour in a rotary autoclave having a net volume of 0.2 liter, after introducing carbon dioxide to a pressure of 50 atmospheres gauge, as described in Example I. At the maximum temperature the carbon dioxide pressure rose to 115 atmospheres gauge. The gray raw product was extracted and worked up as described in the preceding example. The yield of naphthalene-2,6-dicarboxylic acid was 12.4 gm., which is 80.5% of the theoretical yield.

*Example III*

30 gm. potassium-β-naphthoate and 1 gm. cadmium fluoride were placed into a rotary autoclave having a net volume of 0.2 liter and carbon dioxide was introduced until the internal pressure reached 10 atmospheres gauge. Thereafter, the contents were heated to 430° C. for about 1 hour. At the maximum temperature the internal pressure rose to 30 atmospheres gauge. The raw product formed thereby was removed from the autoclave and worked up in the manner described in the preceding examples. The yield of naphthalene-2,6-dicarboxylic acid was 8.5 gm., which is 55.2% of the theoretical yield. Portions of the naphthalene-2,6-dicarboxylic acid thus obtained were then transformed into the corresponding dichloride, dimethylester and diamide, respectively. The melting point of the dichloride was 187° C., that of the dimethylester was 184° C. and the diamide sublimed at 360° C.

*Example IV*

30 gm. potassium-β-naphthoate were placed into a rotary autoclave having a net volume of 0.2 liter, and carbon dioxide was introduced to a pressure of 50 atmospheres gauge. The autoclave and its contents were then heated to 420° C. and held at this temperature for about 4 hours. The internal pressure reached a maximum of 130 atmospheres gauge at 420° C. At the end of the run the autoclave was opened and the contents were extracted with hot water to separate the naphthalene carboxylic acid salts from the naphthalene and the carbon-like side-products formed. The resulting aqueous solution was filtered and then acidified with hydrochloric acid while still hot, whereby naphthalene-2,6-dicarboxylic acid was precipitated out. The precipitate was filtered off and purified by washing with hot alcohol and water. The yield of naphthalene-2,6-dicarboxylic acid was 1.1 gm., which is 7.7% of the theoretical yield.

The acidified aqueous solution and the aqueous and alcoholic washing solutions were combined and extracted with ether. 13.0 gm. of β-naphthoic acid were thus recovered, which is 53% of the amount of β-naphthoic acid used as the starting material.

*Example V*

30 gm. potassium-β-naphthoate admixed with 1 gm. cadmium fluoride were heated for one hour at 430° C. in a rotary autoclave having a net volume of 0.2 liter. Prior to heating the starting materials, nitrogen was introduced into the autoclave to a pressure of 50 atmospheres gauge. The raw product obtained in this manner was worked up as in the preceding examples and yielded 0.9 gm. naphthalene-2,6-dicarboxylic acid, which is 5.8% of the theoretical yield. By combining the wash solutions and the acidified aqueous solution, and extracting the same with ether, as described in Example IV, 2.2 gm. of β-naphthoic acid were recovered, which represents 9% of the starting material.

*Example VI*

30 gm. potassium-β-naphthoate admixed with 1 gm. zinc chloride were heated for 1 hour at 430° C. in an autoclave having a net volume of 0.2 liter. Before heating, carbon dioxide was introduced into the autoclave to a pressure of 50 atmospheres gauge. At 430° C. the internal pressure reached 100 atmospheres gauge. The raw product obtained in this manner was worked up in the manner described in the preceding examples to yield 11.7 gm. naphthalene-2,6-dicarboxylic acid, which is 76% of the theoretical yield.

*Example VII*

19.3 gm. potassium-α-naphthoate admixed with 0.6 gm. zinc chloride were heated for 1 hour at 450° C. in an autoclave having a net volume of 0.2 liter. Prior to heating, carbon dioxide was introduced until the internal pressure reached 50 atmospheres gauge. At 450° C. the pressure rose to a maximum of 108 atmospheres gauge. The raw product obtained thereby was worked up in the manner described in the preceding examples. The yield of naphthalene-2,6-dicarboxylic acid was 4.4 gm., which is 44.5% of the theoretical yield.

In place of carbon dioxide in the preceding examples other inert gases such as nitrogen or inert gases containing small amounts of carbon dioxide may be used and in place of the potassium salts of α- and β-naphthoic acid the salts of other mono-valent metals such as the sodium, rubidium, cesium, thallium and the like may be used with some variations in yield.

While we have illustrated certain specific embodiments of the present invention, it will be fully apparent to persons skilled in the art that the invention is not limited to these embodiments and that various changes and modifications can be made without departing from the spirit of the invention or the scope of the appended claims.

We claim:

1. The method of producing naphthalene-2,6-dicarboxylic acid from a naphthalene-monocarboxylic acid selected from the group consisting of α-naphthoic acid and β-naphthoic acid, which comprises converting said naphthalene-monocarboxylic acid into a corresponding mono-alkali metal salt, heating said mono-salt to a temperature above about 360° C. and below the temperature at which substantial decomposition of the starting material and reaction products takes place, in an inert atmosphere of an inert gas selected from the group consisting of carbon dioxide and nitrogen, and converting the di-alkali metal salt of naphthalene-2,6-dicarboxylic acid formed thereby into free naphthalene-2,6-dicarboxylic acid by acidification of said di-alkali metal salt with a strong mineral acid.

2. The method of producing naphthalene-2,6-dicarboxylic acid from a naphthalene-monocarboxylic acid selected from the group consisting of α-naphthoic acid and β-naphthoic acid, which comprises converting said naphthalene-monocarboxylic acid into a corresponding mono-alkali metal salt, heating said mono-salt to a temperature between about 360° C. and about 450° C. in an inert atmosphere of an inert gas selected from the group consisting of carbon dioxide and nitrogen, and converting the di-alkali metal salt of naphthalene-2,6-dicarboxylic acid formed thereby into free naphthalene-2,6-dicarboxylic acid by acidification of said di-alkali metal salt with a strong mineral acid.

3. The method of producing naphthalene-2,6-dicarboxylic acid from a naphthalene-monocarboxylic acid selected from the group consisting of α-naphthoic acid and β-naphthoic acid, which comprises converting said naphthalene-monocarboxylic acid into a corresponding mono-alkali metal salt, heating said mono-salt to a temperature between about 360° C. and about 450° C. in an inert atmosphere of carbon dioxide, and converting the di-alkali metal salt of naphthalene-2,6-dicarboxylic acid formed thereby into free naphthalene-2,6-dicarboxylic acid by acidifying said di-alkali metal salt with a strong mineral acid.

4. The method of producing naphthalene-2,6-dicarboxylic acid from a naphthalene-monocarboxylic acid selected from the group consisting of α-naphthoic acid and β-naphthoic acid, which comprises converting said naphthalene-monocarboxylic acid into a corresponding mono-alkali metal salt, heating said mono-salt to a temperature between about 360° C. and about 450° C. in an inert atmosphere of an inert gas selected from the group consisting of carbon dioxide and nitrogen at superatmospheric pressures, and converting the di-alkali metal salt of naphthalene-2,6-dicarboxylic acid formed thereby into free naphthalene-2,6-dicarboxylic acid by acidification of said di-alkali metal salt with a strong mineral acid.

5. The method of producing naphthalene-2,6-dicarboxylic acid from a naphthalene-monocarboxylic acid selected from the group consisting of α-naphthoic acid and β-naphthoic acid, which comprises converting said naphthalene-monocarboxylic acid into a corresponding mono-alkali metal salt, heating said mono-salt to a temperature between about 360° C. and about 450° C. in an inert atmosphere of an inert gas selected from the group consisting of carbon dioxide and nitrogen at superatmospheric pressures and in the presence of a catalyst selected from the group consisting of lead, mercury, cadmium, zinc and their halides, oxides, sulfates, phosphates, carboxylic acid salts and carbonates, and converting the di-alkali metal salt of naphthalene-2,6-dicarboxylic acid formed thereby into free naphthalene-2,6-dicarboxylic acid by acidification of said di-alkali metal salt with a strong mineral acid.

6. The method of producing naphthalene-2,6-dicarboxylic acid from a naphthalene-monocarboxylic acid selected from the group consisting of α-naphthoic acid and β-naphthoic acid, which comprises converting said naphthalene-monocarboxylic acid into the corresponding mono-potassium salt, heating said mono-salt to a temperature between about 360° C. and about 450° C. in an inert atmosphere of carbon dioxide at superatmospheric pressure and in the presence of cadmium fluoride as a catalyst, and converting the di-potassium salt of naphthalene-2,6-dicarboxylic acid formed thereby into free naphthalene-2,6-dicarboxylic acid by acidification of said di-potassium salt with hydrochloric acid.

7. The method of producing naphthalene-2,6-dicarboxylic acid from a napthalene-monocarboxylic acid selected from the group consisting of α-naphthoic acid and β-naphthoic acid, which comprises converting said naphthalene-monocarboxylic acid into the corresponding mono-potassium salt, heating said mono-salt to a temperature between about 360° C. and about 450° C. in an inert atmosphere of carbon dioxide at superatmospheric pressure and in the presence of zinc chloride as a catalyst, and converting the di-potassium salt of naphthalene-2,6-dicarboxylic acid formed thereby into free naphthalene-2,6-dicarboxylic acid by acidification of said di-potassium salt with hydrochloric acid.

8. The method of converting a mono-alkali metal salt of a naphthalene-monocarboxylic acid into the corresponding di-alkali metal salt of naphthalene-2,6-dicarboxylic acid, which comprises heating the mono-alkali metal salt of a naphthalene-monocarboxylic acid selected from the group consisting of α-naphthoic acid and β-naphthoic acid to a temperature above about 360° C. and below the temperature at which substantial decomposition of the starting material and the reaction products takes place, in an inert atmosphere of an inert gas selected from the group consisting of carbon dioxide and nitrogen.

9. The method of converting a mono-alkali metal salt of a naphthalene-monocarboxylic acid into the corresponding di-alkali metal salt of naphthalene-2,6-dicarboxylic acid, which comprises heating the mono-alkali metal salt of a naphthalene-monocarboxylic acid selected from the group consisting of α-naphthoic acid and β-naphthoic acid to a temperature above about 360° C. and below the temperature at which substantial decomposition of the starting material and the reaction products takes place, in an inert atmosphere of an inert gas selected from the group consisting of carbon dioxide and nitrogen and at superatmospheric pressure.

10. The method of converting a mono-alkali metal salt of a naphthalene-monocarboxylic acid into the corresponding di-alkali metal salt of naphthalene-2,6-dicarboxylic acid, which comprises heating the mono-alkali metal salt of a naphthalene-monocarboxylic acid selected from the group consisting of α-naphthoic acid and β-naphthoic acid to a temperature above about 360° C. and below the temperature at which substantial decomposition of the starting material and the reaction products takes place, in an inert atmosphere of an inert gas selected from the group consisting of carbon dioxide and nitrogen, and in the presence of a catalyst selected from the group consisting of lead, mercury, cadmium, zinc and their halides, oxides, sulfates, phosphates, carboxylic acid salts and carbonates.

11. The method of converting the mono-potassium salt of a naphthalene-monocarboxylic acid into the di-potassium salt of naphthalene-2,6-dicarboxylic acid, which comprises heating the mono-potassium salt of a naphthalene-monocarboxylic acid selected from the group consisting of α-naphthoic acid and β-naphthoic acid to a temperature between about 360° C. and about 450° C. in an inert atmosphere of an inert gas selected from the group consisting of carbon dioxide and nitrogen and in the presence of cadmium fluoride as a catalyst.

12. The method of converting the mono-potassium salt of a naphthalene-monocarboxylic acid into the di-potassium salt of naphthalene-2,6-dicarboxylic acid, which comprises heating the mono-potassium salt of a naphthalene-monocarboxylic acid selected from the group consisting of α-naphthoic acid and β-naphthoic acid to a temperature between about 360° C. and about 450° C. in an inert atmosphere of an inert gas selected from the group consisting of carbon dioxide and nitrogen and in the presence of zinc chloride as a catalyst.

No references cited.